United States Patent [19]

Iwata

[11] Patent Number: 4,665,299
[45] Date of Patent: May 12, 1987

[54] ARC WELDING POWER SOURCE WITH RESPONSE DELAY COMPENSATING CONTROL

[75] Inventor: Akihiko Iwata, Amagasaki, Japan

[73] Assignee: Mitsubishi Denki Kabushiki Kaisha, Tokyo, Japan

[21] Appl. No.: 780,171

[22] Filed: Sep. 26, 1985

[30] Foreign Application Priority Data

Sep. 28, 1984 [JP] Japan ............................... 59-202039
Mar. 25, 1985 [JP] Japan ............................... 60-59753

[51] Int. Cl.⁴ .............................................. B23K 9/10
[52] U.S. Cl. .......................... 219/130.21; 219/130.32; 219/137 PS
[58] Field of Search ............... 219/130.21, 130.51, 219/130.32, 130.33, 137 PS

[56] References Cited

U.S. PATENT DOCUMENTS 3,792,225  2/1974  Needham et al. ............ 219/130.21
4,469,933  9/1984  Mizuno et al. ............... 219/130.21
4,476,376  10/1984 Mizuno et al. ............... 219/130.21
4,544,826  10/1985 Nakanishi et al. ............ 219/130.21
4,560,857  12/1985 Segawa et al. ................ 219/130.21

Primary Examiner—Clifford C. Shaw
Attorney, Agent, or Firm—Leydig, Voit & Mayer

[57] ABSTRACT

An arc welding power source utilizing welding current from a two-step voltage conversion comprising a first target value setting circuit means for setting a first current target value $V_1$ corresponding to a desired value of welding current, a current control circuit for controlling the welding current in accordance with the first current target value $V_1$, a second target value setting circuit means for setting a second current target value $V_2$ higher than the first current target value for satisfying a predetermined current waveform in response to an abrupt load variation, and a rapid operation current control circuit for controlling the welding current in accordance with the second current target value $V_2$. Thus, even if the welding load tends to abruptly vary and the welding current tends to largely exceed the first current target value $V_1$, the welding current is clipped by the second current target value $V_2$ by the rapid operation current control circuit having a rapid response so as to maintain the actual welding current in the allowable $V_1$-$V_2$ range.

2 Claims, 10 Drawing Figures

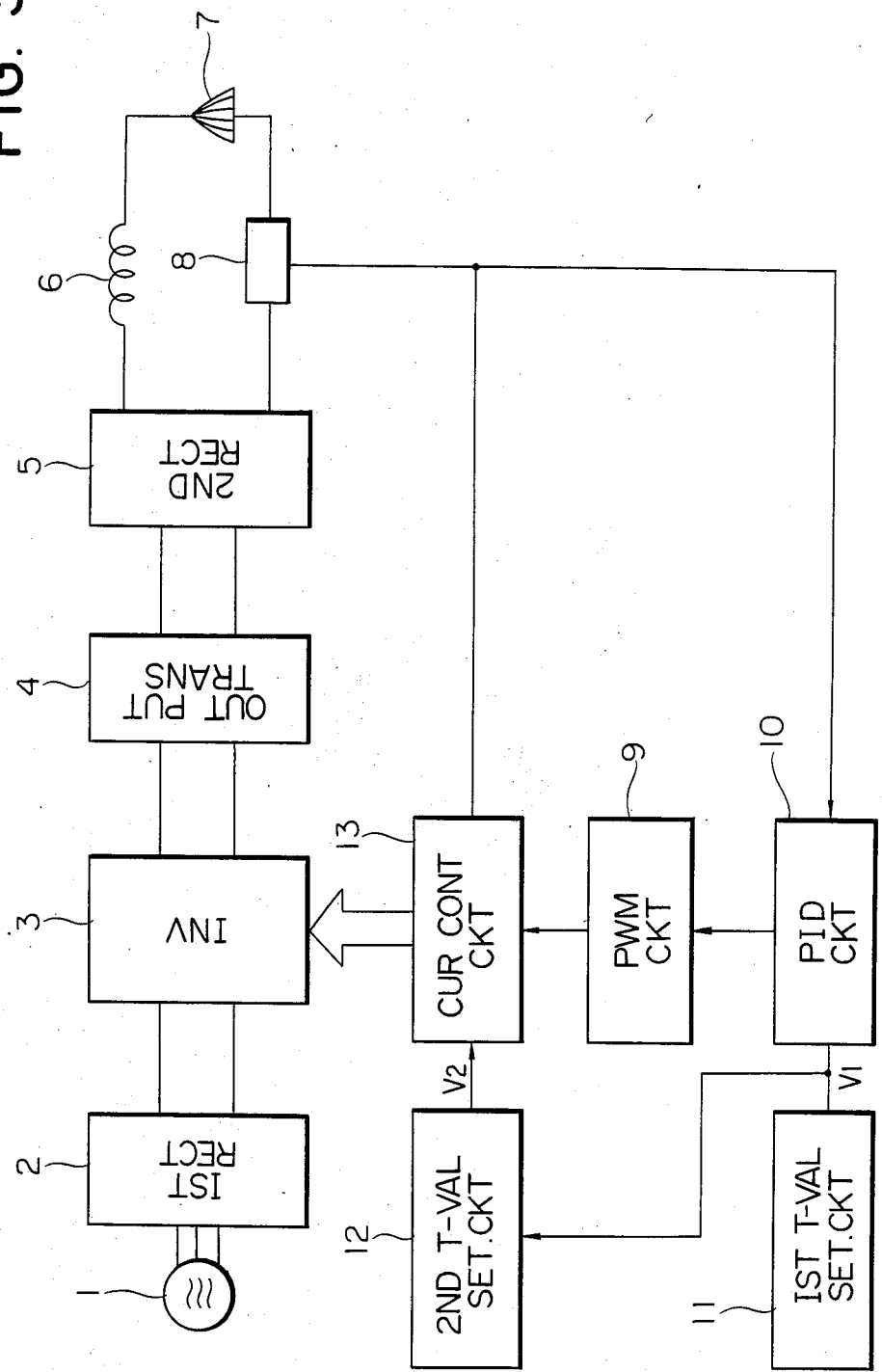

ARC WELDING POWER SOURCE WITH RESPONSE DELAY COMPENSATING CONTROL

BACKGROUND OF THE INVENTION

The present invention relates to an arc welding power source.

FIG. 1 is a diagram of an electric circuit of the construction of a conventional arc welding power source. In FIG. 1, reference numeral 1 designates 3-phase inputs. Numeral 2 designates a first rectifier circuit for converting the 3-phase inputs into a D.C. voltage; numeral 2a designates a smoothing capacitor; numeral 3 designates an inverter for converting the D.C. voltage into an interrupted A.C. voltage; numeral 4 designates an output transformer for stepping down the interrupted A.C. voltage; numeral 5 designates a second rectifier circuit for converting the stepped down interrupted A.C voltage into a D.C. voltage together with a filter reactor 6; numeral 7 designates a welding load; numeral 8 designates a current detector for detecting the current of the welding load 7; numeral 9 designates a pulse width modulator (hereinafter referred to as "PWM") circuit; and numeral 10 designates a PID current control circuit for controlling the output of the current detector 8 so as to coincide with a first current target value determined by combining an input signal with its integrated and differentiated signals. Numeral 11 designates a first target setting circuit for setting the first current target value.

In the conventional arc welding power source of the above-mentioned construction, the 3-phase inputs 1 are converted by first rectifier circuit 2 into the D.C. voltage. The converted D.C. voltage is converted by the inverter 3 into the interrupted A.C. voltage. This interrupted AC voltage is further stepped down by the output transformer 4 and then converted into a welding D.C. voltage by the second rectifier circuit 5 and the filter reactor 6. The converted welding D.C. voltage is supplied to the welding load 7. The PID current control circuit 10 is operated so that the output signal fed back from the current detector 8 for detecting the current of the welding load 7 coincides with the output signal of the first target value setting circuit 11. The output of the PID current control circuit 10 is pulse-width-modulated by the PWM circuit 9, and then transmitted to the inverter 3.

Since the PID current control circuit 10 has a slight response delay for the variation of the welding load 7, the output current largely exceeds the target value as shown in FIG. 2 when the welding load 7 abruptly varies, i.e., switches from the arc to a shortcircuit. Therefore, an adequate current waveform is not formed, the arc is regenerated momentarily from the shortcircuit due to the large current to cause the welding to become unstable such as the transfer of the welding droplet to become irregular, or when the current exceeding the target value at the shortcircuiting time is large, the inverter 3 might be damaged.

SUMMARY OF THE INVENTION

The present invention is made to eliminate the problems pointed out above, and has for its object to provide an arc welding power source, which can stably weld and does not damage an inverter by the current at the shortcircuiting time.

According to the present invention, there is provided an arc welding power source utilizing welding current from a two-step voltage conversion comprising a first target value setting circuit means for setting a first current target value $V_1$ corresponding to a desired value of welding current, a current control circuit for controlling the welding current in accordance with the first current target value $V_1$, a second target value setting circuit means for setting a second current target value $V_2$ higher than the first current target value for satisfying a predetermined current waveform in response to an abrupt load variation, and a rapid operation current control circuit for controlling the welding current in accordance with the second current target value $V_2$. Thus, even if the welding load tends to abruptly vary and the welding current tends to largely exceed the first current target value $V_1$, the welding current is clipped by the second current target value $V_2$ by the rapid operation current control circuit having a rapid response to as to maintain the actual welding current in the allowable $V_1$–$V_2$ range.

An arc welding power source with response delay compensating control comprising a first rectifier circuit for converting an A.C. voltage into a D.C. voltage; an inverter having a switching element for converting the D.C voltage into an interrupted A.C. voltage; a step-down output transformer for stepping down the interrupted A.C. voltage; a second rectifier circuit for converting the stepped-down A.C. voltage into an input D.C. voltage; a filter reactor providing a current path for supplying a welding current to a welding load on the basis of the input D.C. voltage; a circuit for setting a first target value corresponding to a desired value of welding current; a PID current control circuit for controlling the welding current in accordance with the first current target value, the PID current control circuit having a slight response delay due to welding load variations; a circuit for setting a second current target value higher than the first current target value; and a rapid operation current control circuit connected to the PID current control circuit for compensating for the delay introduced by the PID current control circuit, the rapid operation current control circuit receiving a current of a value representing the actual welding current when a welding load abruptly varies and the actual welding current switches from an arc to a short circuit and the rapid operation current control circuit being further connected to the second target value setting circuit for receiving the second target value and to the inverter for controlling the inverter so that the actual welding current supplied to the welding load does not exceed the second current target value.

BRIEF DESCRIPTION OF THE DRAWINGS

FIG. 3 is a circuit diagram showing an embodiment of the present invention;

In the drawings, the same symbols indicate the same or corresponding parts.

DESCRIPTION OF THE PREFERRED EMBODIMENTS

Figure 1:
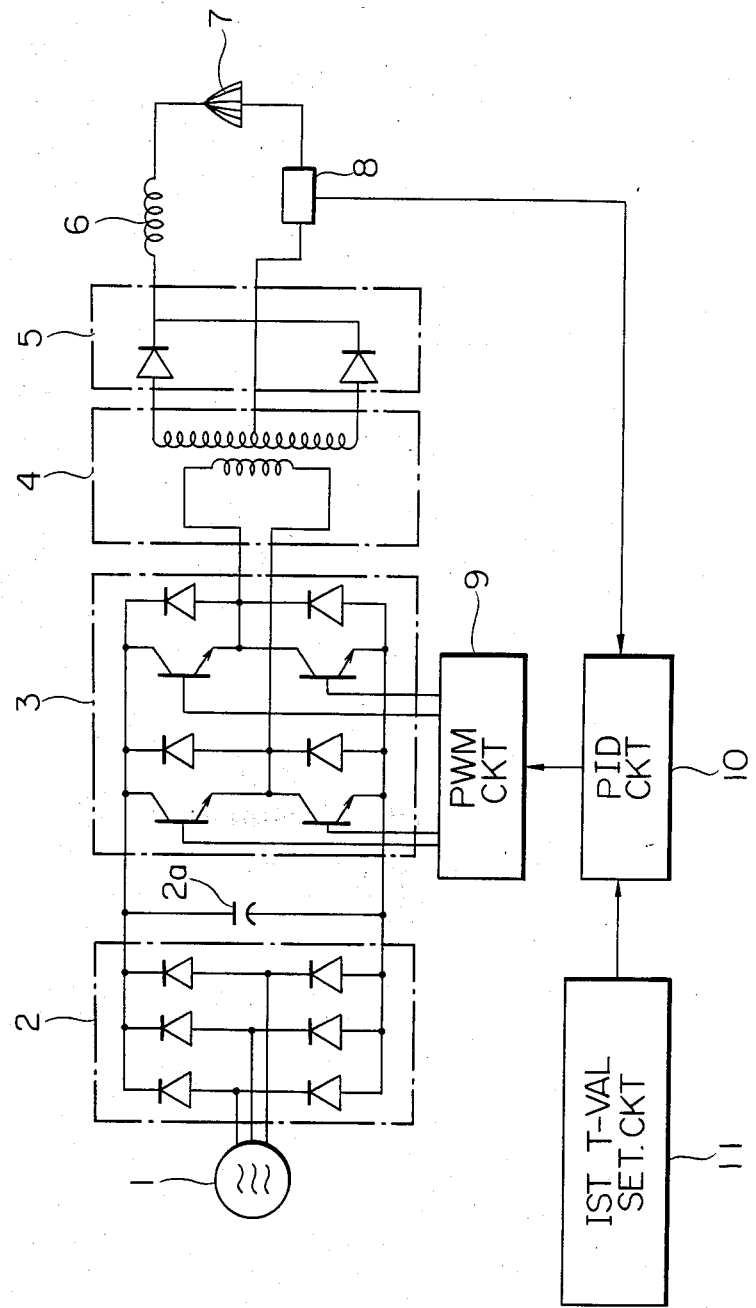
FIG. 1 is a circuit diagram showing a conventional arc welding power source.

FIG. 3 is a block diagram of an arc welding power source showing an embodiment of the present invention, and reference numerals 1 to 11 indicate the same parts as those in FIG. 1. Reference numeral 12 designates a second target value setting circuit for setting a second current target value $V_2$, which receives the first current target value $V_1$ of the output of the first target value setting circuit 11 and outputs a second current target value $V_2$. Numeral 13 designates a rapid operation type current control circuit, which receives the second current target value $V_2$ of the output from the second target value setting circuit 12 and the output of the PWM circuit 9, and transmits a drive signal to the inverter 3.

Figure 2:
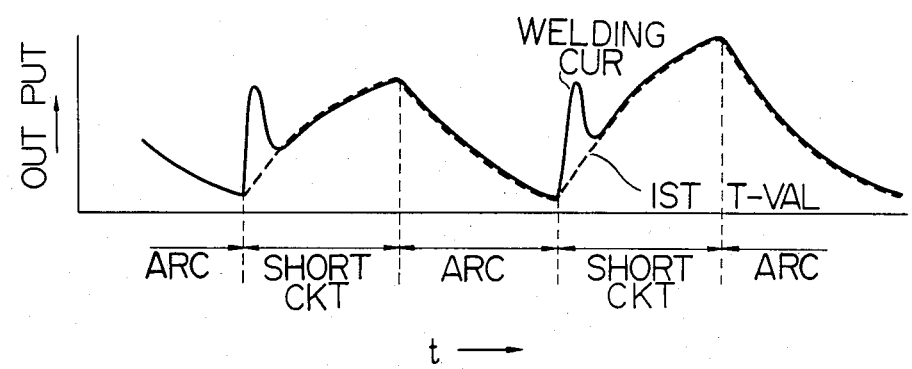
FIG. 2 is a diagram of a current waveform for explaining the operation of the power source of FIG. 1.
Figure 4:
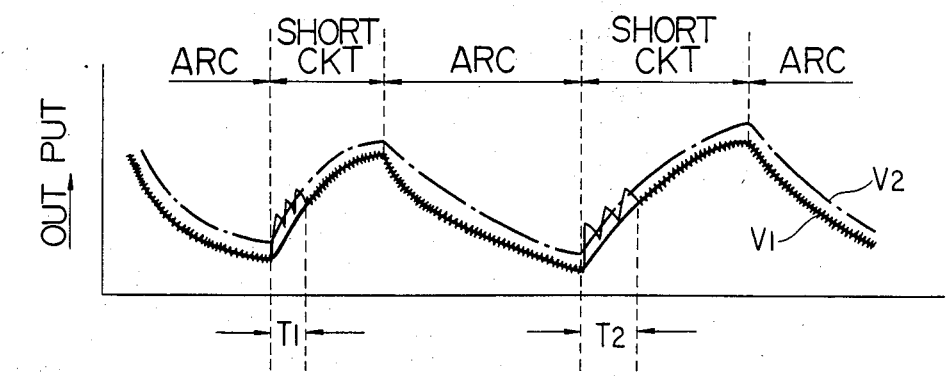
FIG. 4 is a diagram of a current waveform for explaining the operation of the power source of FIG. 3.

The operation of the embodiment of FIG. 3 will be described below. The second current target value $V_2$ is set by the second target value setting circuit 12, which receives the first current target value $V_1$, to a value slightly higher than the first current target value $V_1$ as shown in FIG. 2. In other words, the welding current is ordinarily controlled by the PID current control circuit 10 in accordance with the first current target value $V_1$. However, since the PID current control circuit 10 has a response delay, the PID current control circuit 10 cannot control the welding current in accordance with the first current target value $V_1$ when the load abruptly varies and particularly when transferring from the arc to the shortcircuit. More particularly, the welding current tends to further rise over the first current target value $V_1$, but when the welding current becomes the second current target value $V_2$, the very rapid current control circuit 13 operates, for example, to clip the welding current at the second current target value $V_2$ by the response to the chopping operation of the inverter 3. After a time period is elapsed, the PID control circuit 10 responds, and the welding current eventually coincides with the first current target value $V_1$. In FIG. 2, the period that the current control circuit 13 operates is $T_1$ and $T_2$, and the PID current control circuit 10 controls the welding current during the other periods.

In the embodiment described above, the current control system employs the PWM current control. However, the present invention is not limited to the particular embodiment. For example, the present invention may employ other current control system.

In the embodiment described above, the feedback current control system employs the PID control. However, the present invention is not limited to the particular embodiment. For example, the present invention may employ other control system.

In the embodiment described above, the rapid operation type current control circuit 13 receives the output of the PID current control circuit. However, the present invention is not limited to the particular embodiment. For example, the present invention may not always receive the same.

Figure 5:
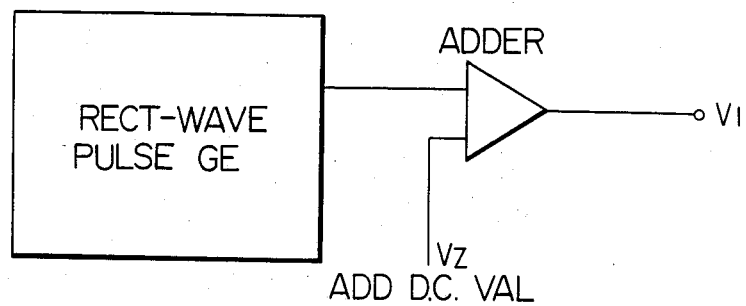
FIG. 5 is a circuit diagram showing a first target value setting circuit shown in FIG. 3.
Figure 6:
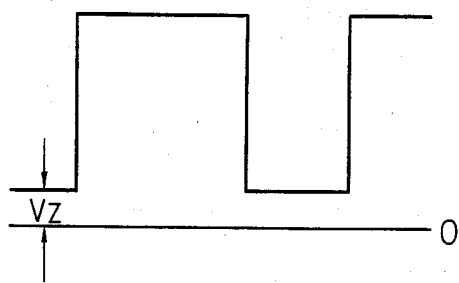
FIG. 6 is a diagram of a waveform of the output voltage of FIG. 5.
Figure 7:
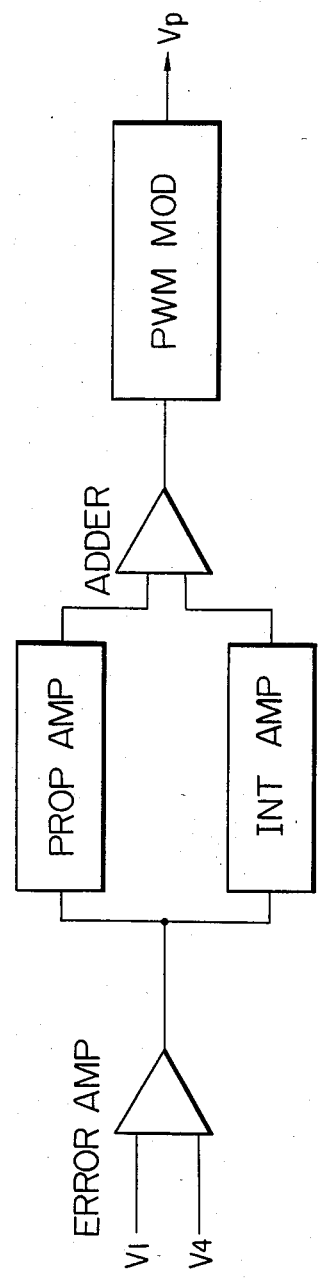
FIG. 7 is a circuit diagram showing a PID circuit shown in FIG. 3.
Figure 8:
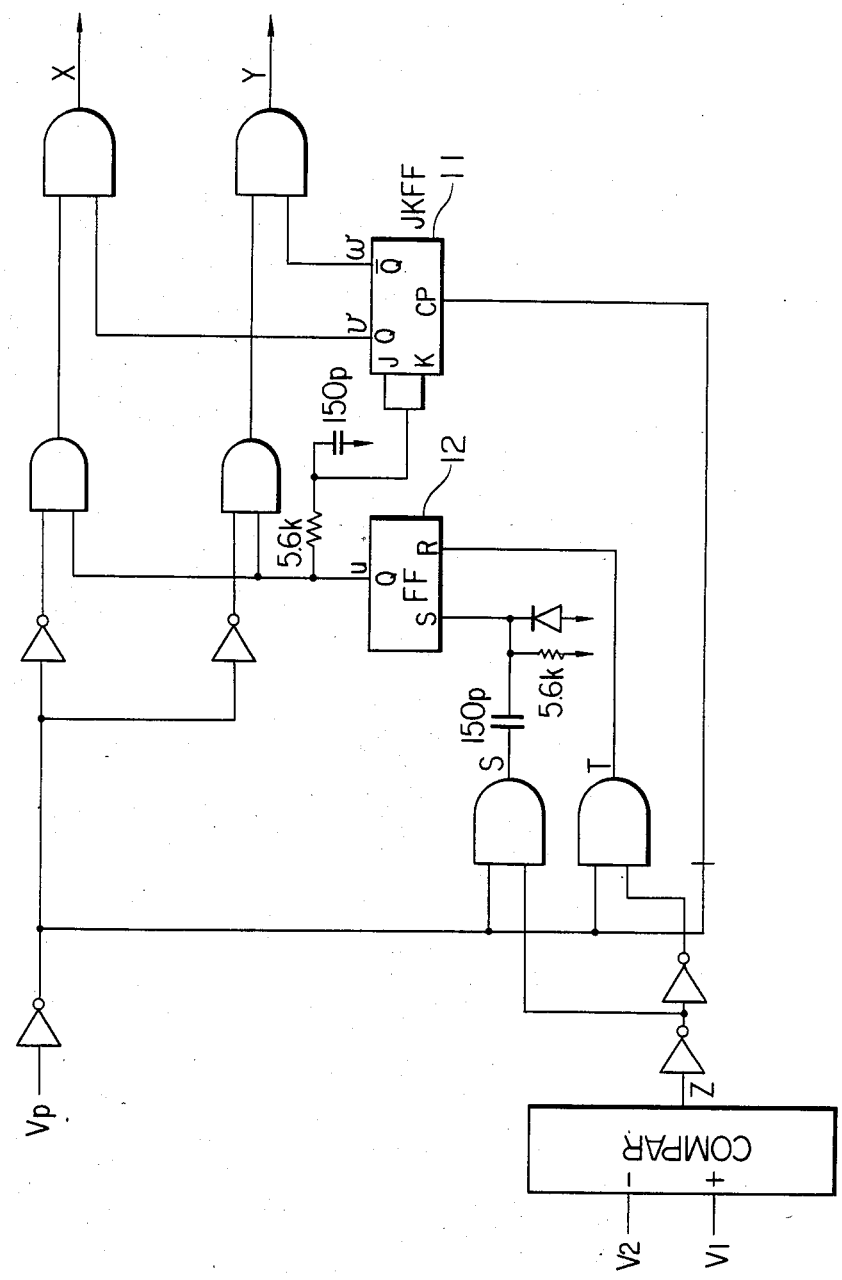
FIG. 8 is a circuit diagram showing a current control circuit shown in FIG. 3.
Figure 9:
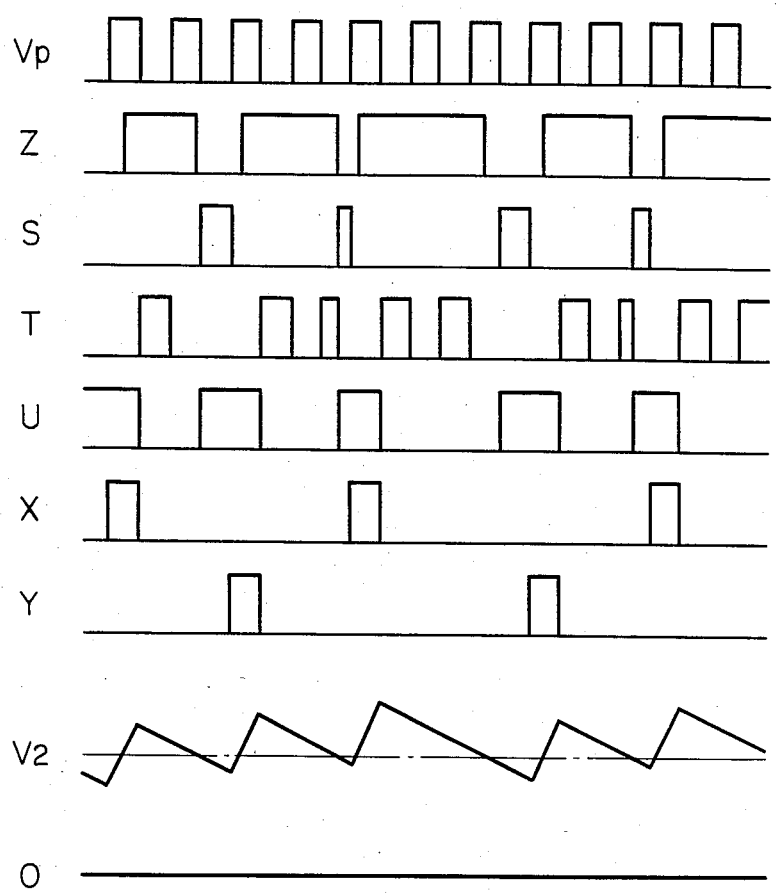
FIG. 9 is a timechart of FIG. 8.

FIG. 5 is a circuit diagram showing an example of the first target value setting circuit of FIG. 3. This setting circuit has a rectangular wave pulse generator and an adder for adding D.C. added value Vz. The D.C. added value Vz corresponds to the base current of a pulse welding. FIG. 6 is a diagram showing the output $V_1$ of the first target value setting circuit 11. FIG. 7 is a circuit diagram showing the PID circuit 10 of FIG. 3, which proportionally amplifies, integrally amplifies and adds the errors of the voltages $V_1$ and $V_4$, and PWM-modulates the added value. FIG. 8 is a circuit diagram showing an example of the current control circuit 13 in FIG. 3, and FIG. 9 is a timechart of FIG. 8. In FIG. 8, a flip-flop JKFF 11 always operates to alternatively produce the outputs X and Y to prevent the irregular magnetization. A flip-flop FF 12 stops the inverter when the output current detection signal $V_1$ is higher than the command value $V_2$ to perform a so-called chopping operation.

Figure 10:
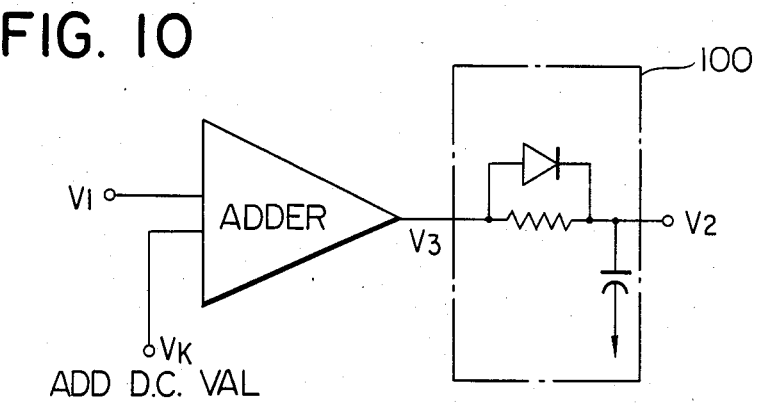
FIG. 10 is a circuit diagram showing a second target value setting circuit shown in FIG. 3.

The second target value setting circuit 12 is shown in FIG. 10. In FIG. 10, the added D.C. value $V_k$ is first added to the $V_1$, the output is applied to a modified filter 100, which produces an output $V_2$. The filter 100 is added by considering the delay of the PID control circuit 10.

According to the present invention as described above, the actual current value supplied to the welding load is controlled by the second target value setting circuit means which receives the output of the first current target value and outputs the second current target value, the rapid operation current control circuit is operated by the second current target value from the second target value setting circuit, means and clipped by the second current target value which does not exceed the first current target value. Therefore, even if the welding load abruptly varies in a MIG welding, a predetermined current can be flowed to the load, thereby enabling the stable welding and preventing the damage of the inverter.

What is claimed is:

1. An arc welding power source with response delay compensating control comprising:
    a first rectifier circuit for converting an A.C. voltage into a D.C. voltage;
    an inverter having a switching element for converting the D.C. voltage into an interrupted A.C. voltage;
    a step-down output transformer for stepping down the interrupted A.C. voltage;
    a second rectifier circuit for converting the stepped down A.C. voltage into an input D.C. voltage;
    a filter reactor providing a current path for supplying a welding current to a welding load on the basis of the input D.C. voltage;
    a first target value setting circuit means for setting a first current target value corresponding to a desired value of welding current;
    a PID current control circuit for controlling the welding current in accordance with the first current target value, said PID current control circuit having a slight response delay due to welding load variations;
    a second target value setting circuit means for setting a second current target value higher than the first current target value set by said first target value setting circuit means; and
    a rapid operation current control circuit connected to said PID current control circuit for compensating for the delay introduced by said PID current control circuit, said rapid operation current control circuit receiving a current of a value representing the actual welding current when a welding load abruptly varies and the actual welding current switches from an arc to a shortcircuit, and to said second target value setting circuit means for receiving the second current target value, and to said inverter for controlling the inverter so that the actual welding current supplied to the welding load does not exceed the second current target value.

2. An arc welding power source according to claim 1 wherein said rapid operation current control circuit includes a bistable circuit for controlling said inverter in accordance with the first and second target values.

* * * * *